United States Patent
Hayashi et al.

[11] Patent Number: 6,122,903
[45] Date of Patent: Sep. 26, 2000

[54] APPARATUS FOR RAISING AND LOWERING A MOWER UNIT

[75] Inventors: Masaki Hayashi; Masatake Murakawa; Kazuaki Kurohara; Nobuyuki Yamashita; Mikio Yuki; Eriya Harada, all of Osaka, Japan

[73] Assignee: Kubota Corporation, Osaka, Japan

[21] Appl. No.: 08/957,799

[22] Filed: Oct. 24, 1997

[30] Foreign Application Priority Data

Apr. 3, 1997 [JP] Japan ........................................ 9-84848

[51] Int. Cl.[7] .................................................. A01D 34/74
[52] U.S. Cl. ............................ 56/15.8; 58/15.7; 58/17.1; 58/DIG. 22
[58] Field of Search ................................... 56/15.7, 15.8, 56/17.1, DIG. 9, DIG. 22

[56] References Cited

U.S. PATENT DOCUMENTS

| | | | |
|---|---|---|---|
| 3,654,749 | 4/1972 | Ostergren et al. | 56/DIG. 22 X |
| 4,120,136 | 10/1978 | Rose | 56/17.1 |
| 4,747,257 | 5/1988 | Hutchinson | 56/15.8 |
| 4,760,686 | 8/1988 | Samejima et al. | 56/15.8 |
| 5,123,234 | 6/1992 | Harada et al. | 56/10.2 |
| 5,381,648 | 1/1995 | Seegert et al. | 56/17.1 |
| 5,816,033 | 10/1998 | Busboom et al. | 56/10.8 |

FOREIGN PATENT DOCUMENTS

H4-94931  4/1992  Japan .

*Primary Examiner*—H. Shackelford
*Attorney, Agent, or Firm*—Ronald E. Greigg; Edwin E. Greigg

[57] ABSTRACT

An apparatus for raising and lowering a mower unit, having a control lever movable between a first terminal position and a second terminal position for raising and lowering the mower unit, a link mechanism for raising the mower unit with movement from the first terminal position to the second terminal position of the control lever, a first stopper for holding the control lever in the first terminal position, a second stopper for holding the control lever in the second terminal position, and an assist mechanism for applying a force to the link mechanism to raise the mower unit only when the control lever is located between the first terminal position and the second terminal position.

10 Claims, 5 Drawing Sheets

APPARATUS FOR RAISING AND LOWERING A MOWER UNIT

BACKGROUND OF THE INVENTION

1. Field of the Invention

This invention relates to an apparatus for raising and lowering a mower unit vertically movably connected to a lawn tractor, the apparatus including a control lever for raising and lowering the mower unit, and an assist mechanism for assisting operations of the control lever to raise and lower the mower unit.

2. Description of the Related Art

In this type of conventional apparatus for raising and lowering a mower unit connected to a lawn tractor, an upward assisting force is constantly applied to the mower unit by means of coil springs or the like to reduce an upward operating force.

In the prior art noted above, the upward assisting force may be increased to minimize the upward operating force. Then, the mower unit can easily be raised since the increased upward assisting force constantly acts on the mower unit. For example, during a grass cutting operation on a rugged ground with the mower unit lowered, the mower unit could rise easily to a large extent only by a minor upward thrust applied thereto. Thus, the mower unit tends to move up and down unstably during an operation on a rugged ground, resulting in non-uniform grass cutting heights.

If the upward assisting force is reduced to avoid the above inconvenience, a strong upward operating force will be required which lowers the efficiency of raising the mower unit.

SUMMARY OF THE INVENTION

The object of this invention is to suppress unstable vertical movement of a mower unit occurring during a grass cutting operation, while maintaining a high level of efficiency in raising the mower unit.

The above object is fulfilled, according to this invention, by an apparatus for raising and lowering a mower unit comprising:

- a control lever movable between a first terminal position and a second terminal position for raising and lowering the mower unit:
- a link mechanism for raising the mower unit with movement from the first terminal position to the second terminal position of the control lever;
- a first stopper for holding the control lever in the first terminal position;
- a second stopper for holding the control lever in the second terminal position; and
- an assist mechanism for applying a force to the link mechanism to raise the mower unit only when the control lever is located between the first terminal position and the second terminal position.

According to this construction, the assist mechanism applies the upward assisting force to the mower unit only when the control lever is operated. When the lawn tractor travels, the control lever is maintained in the first or second terminal position by one of the stoppers. Thus, the upward assisting force of the assist mechanism is not applied to the mower unit. As a result, ups and downs of the mower unit are suppressed when the lawn tractor travels.

A different raising and lowering apparatus according to this invention comprises a control lever, a connecting mechanism for connecting the control lever and the mower unit, an assisting device for applying an upward assisting force when the control lever is operated to raise the mower unit through the connecting mechanism, thereby to reduce an operating force required to operate the control lever in a raising direction, the assisting device constantly applying a first upward assisting force to raise the mower unit, and applying a second upward assisting force to raise the mower unit only when the control lever is operated in the raising direction.

The assisting device constantly applies the first assisting force, and applies the first and second assisting forces when the mower unit is raised. When the tractor travels, e.g. in a grass cutting operation, only the first assisting force is applied so that the weight of the mower unit acts as an increased resistance to ascent of the mower unit. Thus, the mower unit is appropriately difficult to move upward. When the control lever is operated in the raising direction, the first and second assisting forces are applied to provide a combined, increased assisting force, thereby to reduce the upward operating force significantly.

Consequently, undesirable ups and downs of the mower unit are suppressed to stabilize a cutting height during a grass cutting operation. At the same time, the mower unit may be raised and lowered efficiently.

In a preferred embodiment of this invention, the connecting mechanism includes a pivotal link mechanism interlocked to the control lever, and a raising and lowering link mechanism for raising and lowering the mower unit in response to movement of the pivotal link mechanism. The assisting device includes a first assist mechanism for applying the first upward assisting force to the raising and lowering link mechanism, and a second assist mechanism for applying the second assistance force to the pivotal link mechanism. A descent restrictor is provided for determining a limit to descent of the mower unit by contacting and restricting movement of the pivotal link mechanism. The pivotal link mechanism and the raising and lowering link mechanism are connected to each other through a slot and a coupling pin fitted in the slot. The coupling pin is movable through the slot to permit a further downward pivotal movement of the control lever when the mower unit is restricted by the descent restrictor.

In this embodiment, the coupling pin is fitted in the slot so as to permit a downward pivotal movement of the control lever. That is, the coupling pin moves through the pin slot when an upward thrust acts on the mower unit. This pin movement prevents an upward pivotal movement of links from being transmitted to the control lever, and prevents the second assisting force of the second assist mechanism from acting on the mower unit. Further, when the control lever is operated in the raising direction, with the mower unit restricted against descent by the descent restrictor, the coupling pin engages an end of the pin slot to transmit the operation in the raising direction of the control lever to the raising and lowering link mechanism. As a result, the second assisting force of the second assist mechanism acts on the mower unit. During a grass cutting operation with the mower unit lowered, only the first assisting force is applied to the mower unit. When the control lever is operated in the raising direction to raise the mower unit, the first and second assisting forces are applied to the mower unit.

Other features and advantages of this invention will be apparent from the following description of an embodiment taken with reference to the drawings.

DESCRIPTION OF THE PREFERRED EMBODIMENTS

Figure 1:
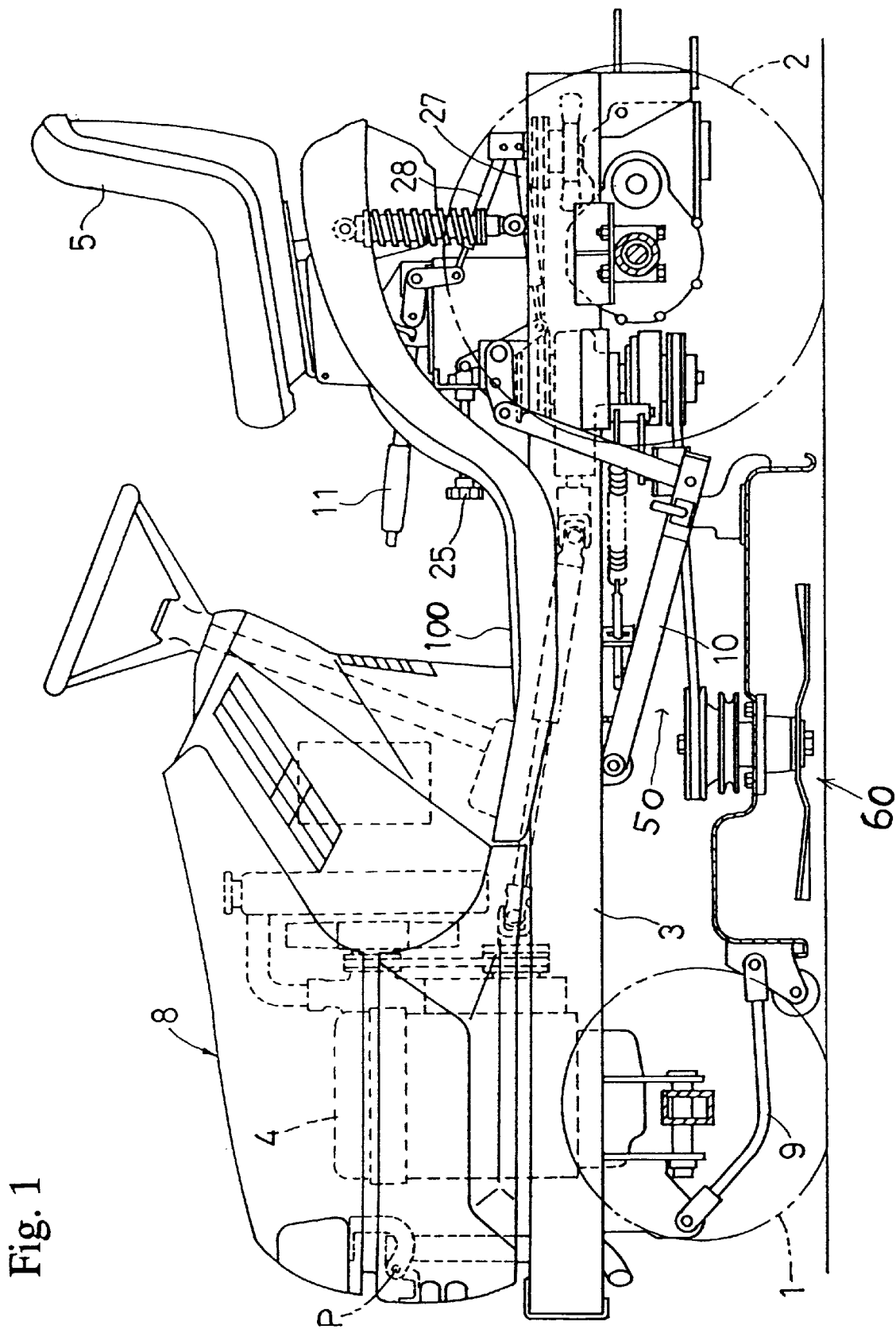
FIG. 1 is a side elevation of a lawn tractor.

As shown in FIG. 1, a riding lawn tractor includes a self-propelled tractor body 100 having a mower unit 60 vertically movably connected thereto through a raising and lowering link mechanism 50.

The tractor body 100 has a body frame 3 supported by a pair of right and left dirigible front wheels 1 and a pair of right and left rear driver wheels 2. An engine 4 is mounted on front portions of the body frame 3, and a driver's seat 5 mounted on rear portions thereof. Numeral 7 denotes a steering wheel for steering the front wheels 1. The engine 4 is enclosed in a hood 8.

The mower unit 60 is disposed between the front wheels 1 and rear wheels 2.

The raising and lowering link mechanism 50 is in the form of a parallelogram link mechanism including a pair of right and left front links 9 and a pair of right and left rear links 10. The link mechanism 50 supports the mower unit 60 to enable parallel vertical movement thereof.

Figure 2:
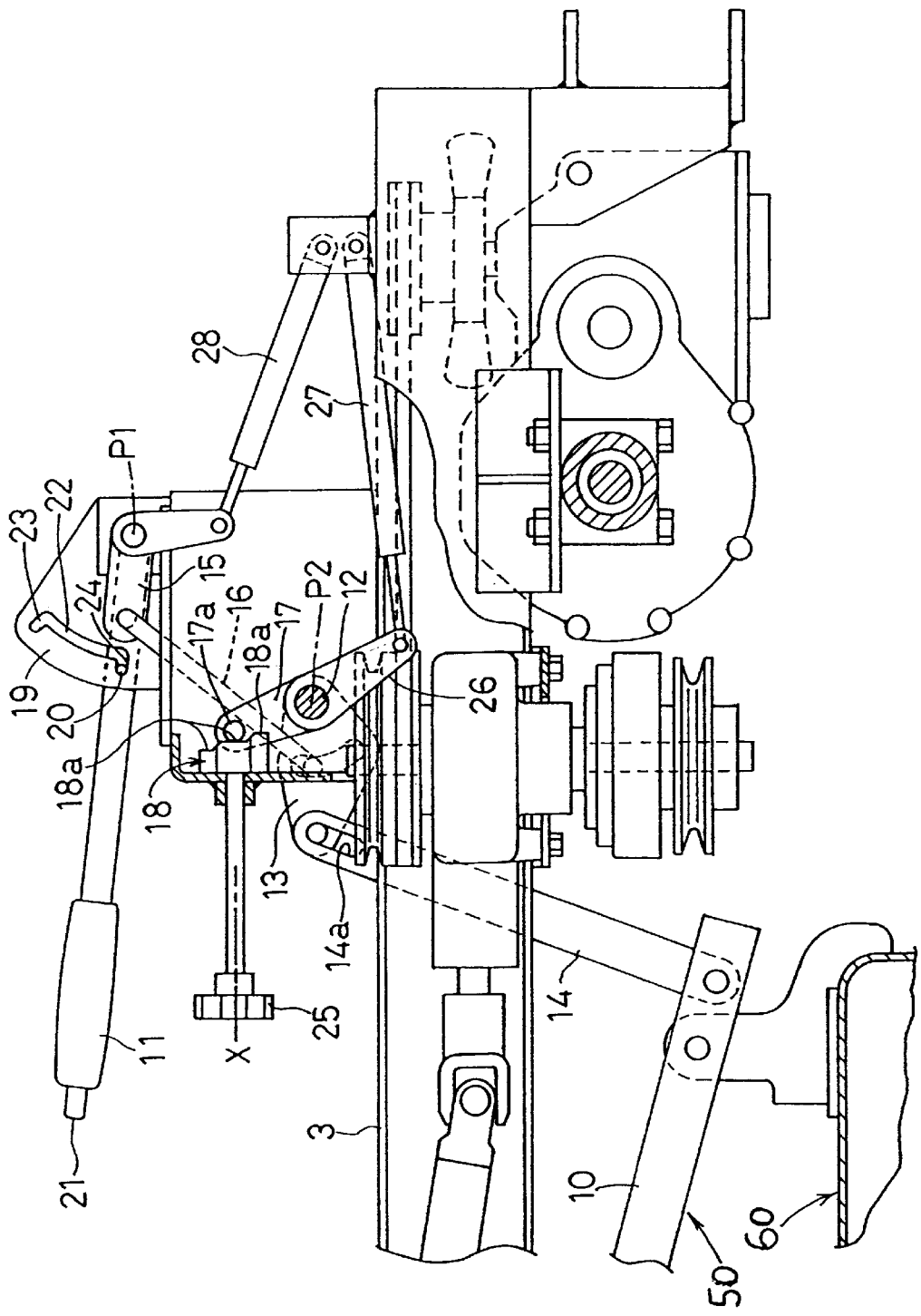
FIG. 2 is a sectional side view of a raising control apparatus.
Figure 3:
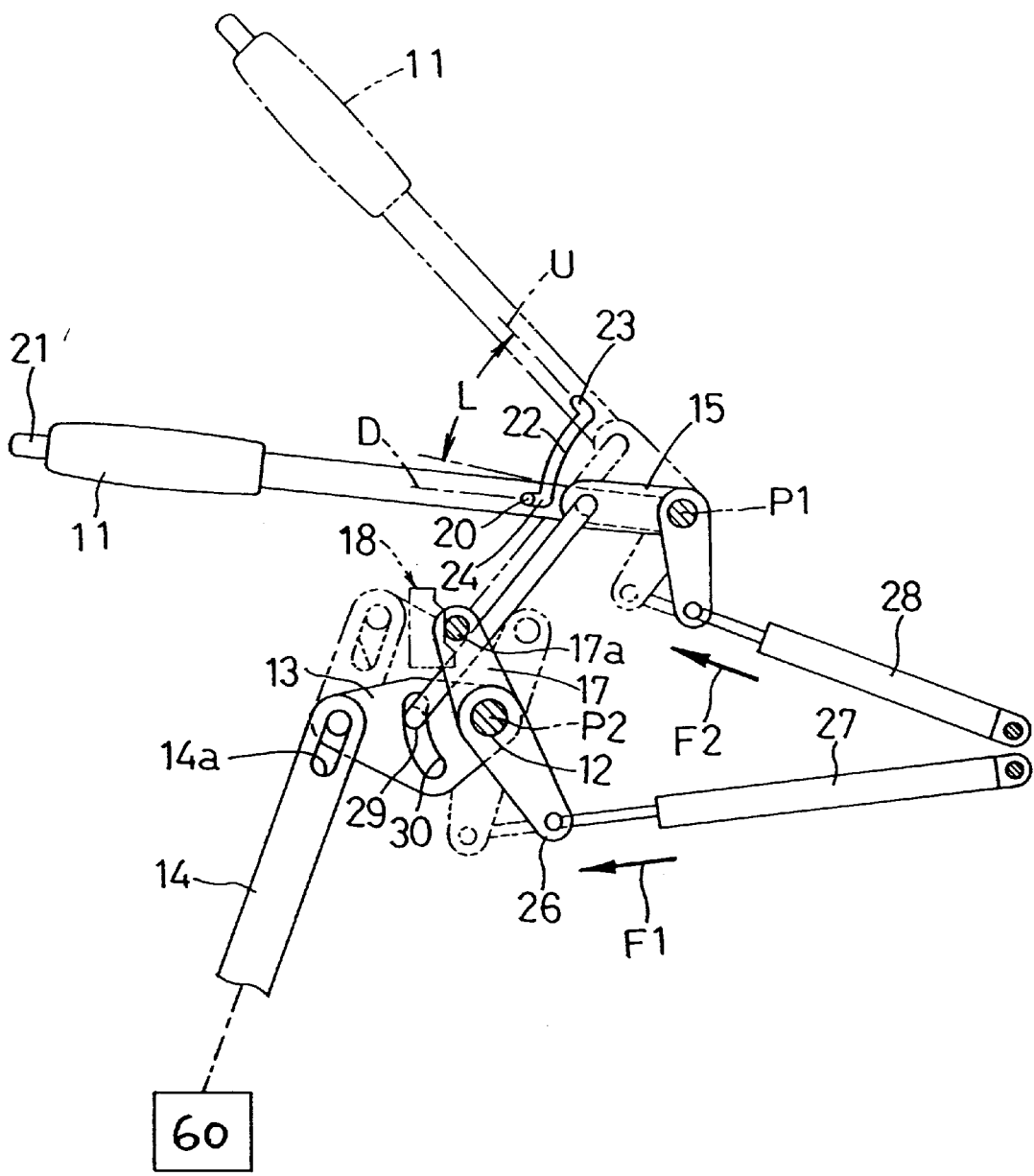
FIG. 3 is a schematic side view of a first and a second assist mechanisms, a pivotal link mechanism and a raising and lowering link mechanism.
Figure 4:
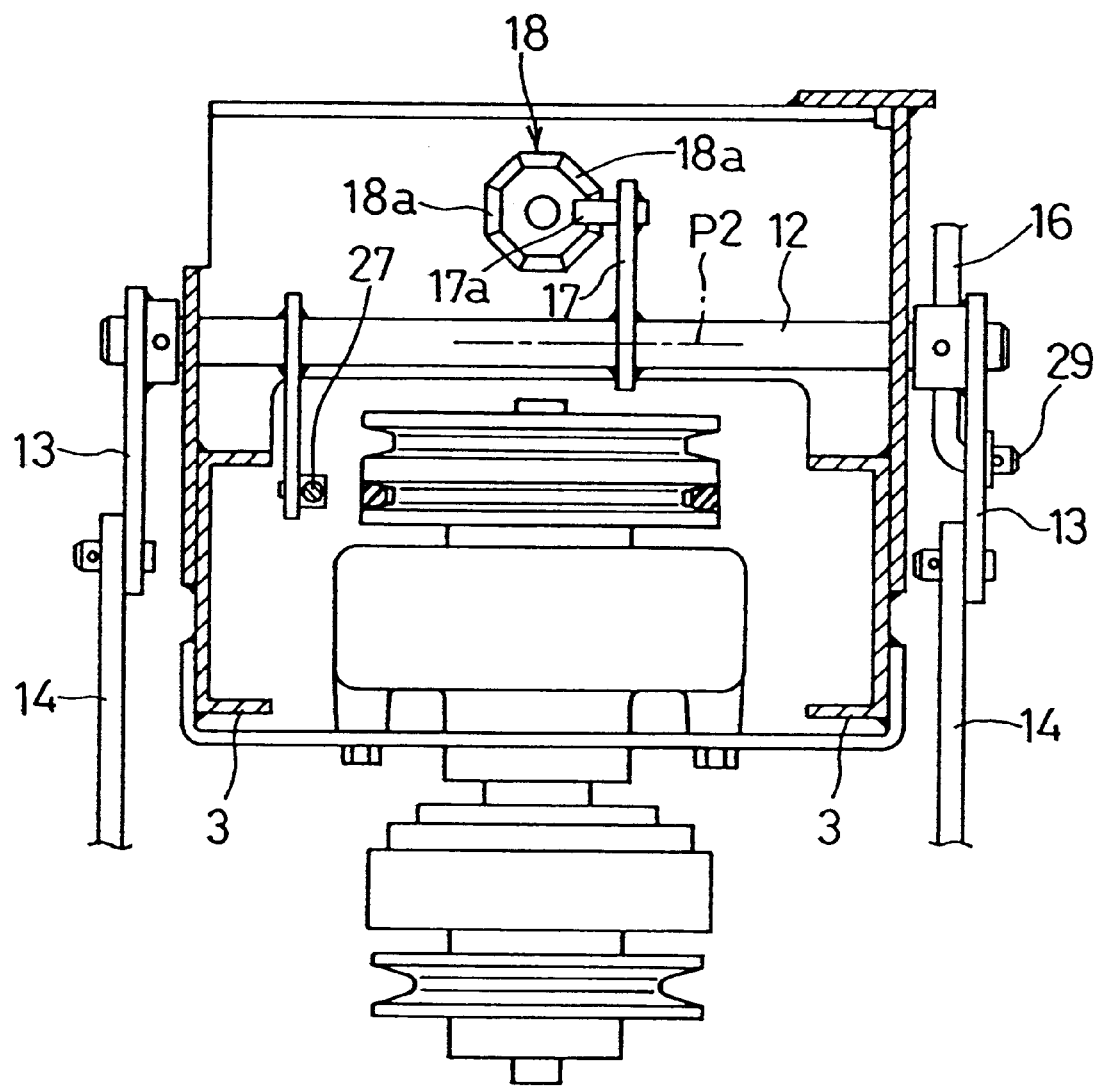
FIG. 4 is a sectional rear view of the raising control apparatus.

The mower unit 60 is vertically movable by a mower unit raising and lowering apparatus. As shown in FIGS. 2 through 4, this apparatus includes a control lever 11 attached to the body frame 3 to be pivotable about a first transverse axis P1 for raising and lowering the mower unit 60. A rotary shaft 12 is attached to the body frame 3 to be rotatable about a second transverse axis P2, and a pair of right and left links 13 are fixed to the opposite ends of the rotary shaft 12. The links 13 are connected through plate-like connecting rods 14 to the rear links 10 of the raising and lowering link mechanism 50, respectively, so that the rear links 10 are pivotable upward with upward pivotal movement of the links 13. A lever 15 pivotable with the control lever 11 is operatively connected to one of the links 13 through a rod 16, so that the link 13 is pivotable upward with upward pivotal movement of the control lever 11. Thus, the control lever 11 pivotable upward to cause the links 13 to pivot upward, which in turn causes the rear links 10 to pivot upward. The control lever 11 pivotable downward to cause the links 13 to pivot downward, which in turn causes the rear links 10 to pivot downward.

Further, the mower unit raising and lowering apparatus includes a lever locking device for locking the control lever 11 in an upward limit position U and a downward limit position D. The rotary shaft 12 has a restricting lever 17 fixed thereto and having a pin 17a. A descent restrictor 18 is contactable with the pin 17a for restricting downward pivotal movement of the links 13, thereby setting a downward limit of movement of the mower unit 60. An assisting device is provided to provide an upward assisting force when the control lever 11 is operated to raise the mower unit 60, thereby reducing an upward operating force required to operate the control lever 11.

The lever locking device includes a lock plate 19 disposed laterally of the control lever 11. The control lever 11 has a lock pin 20 movable longitudinally of the lever between a lock position and an unlock position and biased to the lock position, and a lock release 21 for operating the lock pin 20 to the unlock position against the biasing force. The lock plate 19 defines a pivotal movement restricting groove 22 for receiving the lock pin 20 placed in the unlock position, thereby determining a range of pivotal movement of the control lever 11 between the upward limit position U and downward limit position D. An upper engaging recess 23 is formed for receiving the lock pin 20 from the pivotal movement restricting groove 22 when the control lever 11 is located in the upward limit position U, to set the lock pin 20 to the lock position, thereby locking the control lever 11 in the upward limit position U. A lower engaging recess 24 is formed for receiving the lock pin 20 from the pivotal movement restricting groove 22 when the control lever 11 is located in the downward limit position D, to set the lock pin 20 to the lock position, thereby locking the control lever 11 in the downward limit position D.

The descent restrictor 18 defines a plurality of contact surfaces 18a arranged around a fore and aft axis X and staggered in a direction of pivotal movement of the restricting lever 17 for contacting the pin 17a in varied positions in that direction. The descent restrictor 18 is rotatable about the fore and aft axis X to select one of the contact surfaces 18a for contacting the pin 17a. In this way, the position around the second transverse axis P2 of the restricting lever 17 is adjusted to adjust the downward limit of movement of the mower unit 60, i.e. to adjust a cutting height among a plurality of levels. Numeral 25 denotes a knob for rotating the descent restrictor 18.

The assisting device constantly applies a first assisting force to the mower unit 60, and applies a second assisting force to the mower unit 60 only when the latter is raised. Specifically, the assisting device includes a first assist mechanism 27 for acting on an assist lever 26 fixed to the rotary shaft 12 to apply a first upward assisting force F1 to the links 13, and a second assist mechanism 28 for acting on the lever 15 to apply a second upward assist force F2 to the control lever 11. One of the links 13 defines a pin slot 30 for receiving a coupling pin 29 of the rod 16 in a way to permit downward pivotal movement of the control lever 11 while the mower unit 60 is restricted against descent by the descent restrictor 18. That is, the control lever 11 is pivotable through a vertical movement control range L between the upward limit position U and an intermediate position corresponding to a limit of descent of the mower unit 60 set by the descent restrictor 18.

The first assist mechanism 27 and second assist mechanism 28 are in the form of cylinder-like gas springs extendible under gas pressure to provide the upward assisting forces.

During a grass cutting operation with the control lever 11 locked in the downward limit position D and the mower unit 60 lowered to a position set by the descent restrictor 18, the second upward assisting force F2 is not applied from the second assist mechanism 28 to the mower unit 60 since the control lever 11 is locked in the downward limit position D against the second upward assisting force F2. In this state, only the first upward assisting force F1 is applied from the first assist mechanism 27 to the mower unit 60. When an upward thrust acts on the mower unit, the coupling pin 29 moves along the pin slot 30 to permit upward pivotal movement of the links 13. However, an ascent of the mower unit 60 due to the upward thrust is suppressed since only the first upward assisting force F1 is applied to the mower unit 60. On the other hand, when the control lever 11 is operated upward past the above-mentioned intermediate position, the coupling pin 29 engages the pin slot 30 to raise the links 13. As a result, the first upward assisting force F1 and second upward assisting force F2 are applied to the control lever 11 or mower unit 60, thereby reducing the upward operating force required.

Figure 5:
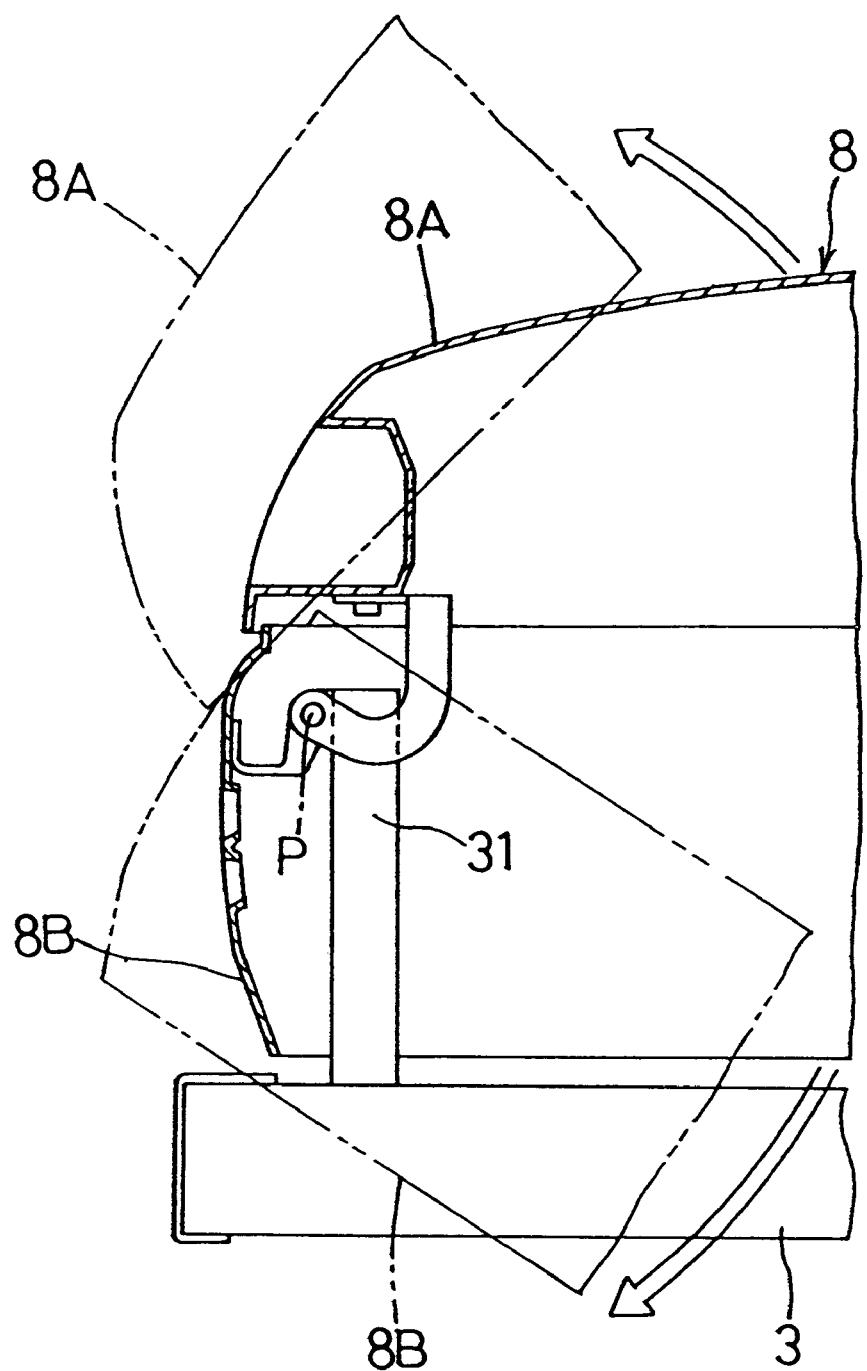
FIG. 5 is a sectional side view of a principal portion of a hood.

As shown in FIG. 5, the hood 8 has a split construction including an upper hood portion 8A and a lower hood portion 8B. The two hood portions 8A and 8B are attached to a stay 31 to be vertically pivotable about a transverse axis P. The upper hood portion 8A is openable by upward pivotal movement, while the lower hood portion 8B is openable by downward pivotal movement.

In the foregoing embodiment, the first assist mechanism 27 and second assist mechanism 28 are in the form of gas springs. The first assist mechanism 27 and second assist mechanism 28 may comprise coil springs, instead.

In the foregoing embodiment, the link 13 and connecting rod 14 are pin-coupled through the slot 14a with an appropriate vertical range of play. In the event of a strong upward thrust acting on the mower unit 60, the mower unit 60 movable upward overriding the first assist mechanism 27. However, the invention may be worked without such play provided by the slot.

The strengths of the first upward assisting force and second upward assisting force may be selected as appropriate.

What is claimed is:

1. An apparatus for raising and lowering a mower unit vertically movably connected to a lawn mower, comprising:
   a control lever;
   a connecting mechanism for connecting said control lever and said mower unit; said connecting mechanism including a pivotal link mechanism interlocked to said control lever; and a raising and lowering link mechanism for raising and lowering said mower unit in response to movement of said pivotal link mechanism; and
   assist means for applying an upward assisting force when said control lever is operated to raise said mower unit through said connecting mechanism, thereby to reduce an operating force required to operate said control lever in a raising direction, wherein said assist means includes a first assist mechanism for constantly applying a first upward assisting force to said raising and lowering link mechanism to raise said mower unit; and a second assist mechanism for applying a second upward assisting force to said pivotal link mechanism to raise said mower unit only when said control lever is operated in said raising direction.

2. A raising and lowering apparatus as defined in claim 1, wherein said first and second assist mechanisms comprise gas springs, respectively.

3. An apparatus for raising and lowering said mower unit vertically movably connected to a lawn mower, comprising:
   a control lever;
   a connecting mechanism for connecting said control lever and said mower unit, said connecting mechanism including a pivotal link mechanism interlocked to said control lever, and a raising and lowering link mechanism for raising and lowering said mower unit in response to movement of said pivotal link mechanism;
   assist means for applying an upward assisting force when said control lever is operated to raise said mower unit through said connecting mechanism, thereby to reduce an operating force required to operate said control lever in a raising direction, said assist means constantly applying a first upward assisting force to raise said mower unit, and applying a second upward assisting force to raise said mower unit only when said control lever is operated in said raising direction, and
   decent restricting means for determining a decent limit of said mower unit by contacting and restricting movement of said pivotal link mechanism.

4. A raising and lowering apparatus as defined in claim 3, wherein said pivotal link mechanism and said raising and lowering link mechanism are connected to each other through a slot and a coupling pin fitted in said slot, said coupling pin being movable through said slot to permit a further downward pivotal movement of said control lever when said mower unit is restricted by said descent restricting means.

5. An apparatus for raising and lowering said mower unit vertically movably connected to a lawn mower, comprising:
   a control lever;
   a connecting mechanism for connecting said control lever and said mower unit;
   a first assist mechanism constantly applying a first upward assisting force by means of said connecting mechanism to said mower unit for urging said mower unit in a raising direction; and
   a second assist mechanism applying a second upward assisting force to said control lever, only when said control lever is operated in said raising direction, wherein said first and second assist mechanisms both reduce an operating force required to raise the mower unit.

6. An apparatus as defined in claim 5, wherein said connecting mechanism includes a pivotal link mechanism interlocked to said control lever, and a raising and lowering link mechanism for raising and lowering said mower unit in response to movement of said pivotal link mechanism.

7. An apparatus as defined in claim 6, wherein said first assist mechanism applies said first assisting force to said raising and lowering link mechanism, and said second assist mechanism applies said second assisting force to said pivotal link mechanism.

8. An apparatus as defined in claim 7, wherein said first assist mechanism and said second assist mechanism comprise gas springs, respectively.

9. An apparatus as defined in claim 6, further comprising decent restricting means for determining a decent limit of said mower unit by contacting and restricting movement of said pivotal link mechanism.

10. An apparatus as defined in claim 9, wherein said pivotal link mechanism and said raising and lowering link mechanism are connected to each other through a slot and a coupling pin fitted in said slot, said coupling pin being movable through said slot to permit a further downward pivotal movement of said control lever when said mower unit is restricted by said decent restricting means.

* * * * *